(12) United States Patent
Yan

(10) Patent No.: US 8,582,766 B2
(45) Date of Patent: Nov. 12, 2013

(54) METHOD FOR ENSURING MEDIA STREAM SECURITY IN IP MULTIMEDIA SUB-SYSTEM

(75) Inventor: Jun Yan, Shenzhen (CN)

(73) Assignee: Inventergy, Inc., Cupertino, CA (US)

( * ) Notice: Subject to any disclaimer, the term of this patent is extended or adjusted under 35 U.S.C. 154(b) by 1644 days.

(21) Appl. No.: 11/774,271

(22) Filed: Jul. 6, 2007

(65) Prior Publication Data

US 2007/0294186 A1 Dec. 20, 2007

Related U.S. Application Data

(63) Continuation of application No. PCT/CN2005/002429, filed on Dec. 31, 2005.

(30) Foreign Application Priority Data

Jan. 7, 2005 (CN) ............... 2005 1 0000097

(51) Int. Cl.
  *H04K 1/00* (2006.01)
(52) U.S. Cl.
  USPC .......... 380/255; 705/71; 380/247; 380/284; 380/270; 380/278; 380/283; 455/466
(58) Field of Classification Search
  USPC ..................... 705/71; 380/247, 284
  See application file for complete search history.

(56) References Cited

U.S. PATENT DOCUMENTS

| | | | |
|---|---|---|---|
| 4,423,287 A | 12/1983 | Zeidler | |
| 7,065,643 B1 * | 6/2006 | Cornils et al. | 713/163 |
| 7,382,881 B2 * | 6/2008 | Uusitalo et al. | 380/262 |
| 7,574,735 B2 * | 8/2009 | Pirttimaa et al. | 726/13 |
| 7,660,417 B2 * | 2/2010 | Blom et al. | 380/249 |
| 7,676,041 B2 * | 3/2010 | Horn et al. | 380/278 |
| 2002/0025045 A1 | 2/2002 | Raike | |
| 2003/0154400 A1 * | 8/2003 | Pirttimaa et al. | 713/201 |
| 2003/0159067 A1 * | 8/2003 | Stirbu | 713/201 |
| 2003/0200431 A1 * | 10/2003 | Stirbu | 713/168 |

(Continued)

FOREIGN PATENT DOCUMENTS

| | | |
|---|---|---|
| CN | 1406005 A | 3/2003 |
| EP | 1 253 762 A1 | 10/2002 |
| WO | 03049357 A2 | 6/2003 |

OTHER PUBLICATIONS http://searchsqlserver.techtarget.com/definition/application-server, Jul. 26, 2000, Terrence Rourke.*

(Continued)

*Primary Examiner* — April Y Blair

(57) ABSTRACT

A method for ensuring media stream security in an IP Multimedia Subsystem network is disclosed. The method includes: assigning an end-to-end media stream security key for a calling User Equipment (UE) or a called UE, by a network device with which the calling UE or the called UE is registered, respectively, and transmitting the media stream security key to a network device with which the opposite end is registered; encrypting the end-to-end media stream security key using a session key shared with the calling UE or the called UE respectively, and transmitting the encrypted end-to-end media stream security key to the calling UE or the called UE, respectively, via a session message; encrypting or decrypting a media stream, by the calling UE or the called UE, respectively, using the end-to-end media stream security key.

18 Claims, 3 Drawing Sheets

(56) References Cited

U.S. PATENT DOCUMENTS

| | | | |
|---|---|---|---|
| 2003/0200433 A1* | 10/2003 | Stirbu | 713/169 |
| 2003/0212912 A1* | 11/2003 | Bajko et al. | 713/202 |
| 2004/0210766 A1 | 10/2004 | Kroselberg | |
| 2005/0216763 A1* | 9/2005 | Lee et al. | 713/200 |
| 2005/0238171 A1* | 10/2005 | Chen et al. | 380/270 |
| 2005/0251681 A1* | 11/2005 | Robles et al. | 713/172 |
| 2006/0079205 A1* | 4/2006 | Semple et al. | 455/411 |
| 2007/0160201 A1* | 7/2007 | Blom et al. | 380/30 |

OTHER PUBLICATIONS http://en.wikipedia.org/wiki/Function, Aug. 22, 2010.*
Written Opinion issued in corresponding PCT application No. PCT/CN2005/002429, dated Apr. 6, 2006, total 4 pages.

* cited by examiner

METHOD FOR ENSURING MEDIA STREAM SECURITY IN IP MULTIMEDIA SUB-SYSTEM

FIELD OF THE INVENTION

The present invention relates to the media stream security technologies in communication networks, and in particular, to a method for ensuring media stream security in an IP Multimedia Subsystem (IMS) network.

BACKGROUND OF THE INVENTION

As a core session control layer in the fixed and mobile networks, the IMS has become a main topic in the art. Many specifications related to the IMS have been defined in the Third Generation Partnership Project (3GPP) and Telecommunications and Internet Converged Services and Protocols for Advanced Networking (TISPAN) standards, which concerns network architecture, interface, protocol, etc. Particularly, security is an important consideration in the 3GPP and TISPAN. In the current specifications, the IMS network is split into an access domain and a network domain in view of the security, and security specifications are defined for the access domain and the network domain respectively. FIG. 1 shows a security model for the IMS network, in which interfaces requiring the security are defined. Although having been described in detail in the specifications, these interfaces are defined only in terms of the control plane of the IMS network, i.e. how to ensure the security of the session protocols in the IMS network, instead of how to ensure the security of the media plane in the IMS network. In fact, the security of the media plane is also very important. Otherwise, media streams may be tampered or eavesdropped during the conversation of the subscribers, which results in degradation of the quality of service for the subscribers or leakage of confidential information.

Usually, an approach for protecting the media streams in the IMS network comprises: a Real-time Transfer Protocol (RTP) proxy is introduced into the architecture of the IMS network; keys are shared between User Equipment (UE) and the RTP proxy through the Generic Bootstrapping Architecture (GBA, which is also a generic authentication and key assignment model defined in the 3GPP specifications); confidentiality and integrity of the media streams are secured between the UE and the RTP proxy through the shared keys, achieving the security of the media streams in the access domain; and the security of the media streams in the network domain may be achieved in two ways: the first one is that no protection is provided between the RTP proxies, if the network is trustable or secure in the network domain; and the other one is that the media streams between the RTP proxies are protected through the IP_Security (IPSec) Encapsulating Security Payload (ESP) protocol under the security mechanism in the 3GPP IMS network domain.

FIG. 2 shows an architecture of the GBA model and FIG. 3 illustrates an application of the GBA model to key assignment for the media streams. In the application, the Session Initiation Protocol (SIP) server (such as Proxy Call Session Control Function (P-CSCF) defined in the 3GPP IMS network) and the RTP proxy are taken as a whole, i.e. a Network Application Function (NAF) entity in the GBA. The SIP server acquires from the Bootstrapping Server Function (BSF) a key shared between the NAF and an SIP client. The key shared between the NAF and an SIP client is stored in the BSF. The SIP server then sends the key to the RTP proxy via Is interface. Thus, the key for media stream security is shared between the SIP client and the RTP proxy.

In the GBA model, both the NAF and the BSF are logical function entities. All Application Servers (ASs) and even the Call Session Control Function (CSCF) entity may be used as an NAF to acquire a key shared with the UE in the GBA processes. Likewise, the BSF may be implemented by any device, such as a CSCF entity, a Home Subscriber Server (HSS), an Authentication, Authorization and Accounting (AAA) server, and a web portal, etc.

SUMMARY OF THE INVENTION

Embodiments of the invention provide a method for enhancing end-to-end media stream security in an IMS network, thereby solving the problem that the security and the quality of service for an end-to-end media stream are impaired as a result of many times of encryption and decryption required for the media stream.

The embodiments of the invention provide the following technical solutions.

A method for ensuring media stream security in an IP Multimedia Subsystem network, including the following steps:

assigning, by a first network device of a first User Equipment, UE, an end-to-end media stream security key for the first UE, and transmitting the end-to-end media stream security key to a second network device of a second UE;

encrypting the end-to-end media stream security key using a first session key shared with the first UE, and transmitting the encrypted end-to-end media stream security key to the first UE via a first session message; encrypting the end-to-end media stream security key using a second session key shared with the second UE, and transmitting the encrypted end-to-end media stream security key to the second UE via a second session message;

encrypting or decrypting a media stream, by at least one of the first UE or the second UE, using the end-to-end media stream security key.

Optionally, the first UE is a calling UE, the second UE is a called UE; or the first UE is a called UE, the second UE is a calling UE.

The first network device may be a Service-Call Session Control Function, S-CSCF, of the first UE, the end-to-end media stream security key is transmitted by the first network device to a Proxy-Call Session Control Function, P-CSCF, of the first UE, and is encrypted and transmitted to the first UE by the P-CSCF of the first UE, the second network device may be an S-CSCF of the second UE, the end-to-end media stream security key is transmitted by the second network device to a P-CSCF of the second UE, and is encrypted and transmitted to the second UE by the P-CSCF of the second UE.

Alternatively, the first network device may be an Application Server, AS, of the first UE, the end-to-end media stream security key is encrypted and transmitted to the first UE by the AS of the first UE, the second network device may be an AS of the second UE, the end-to-end media stream security key is encrypted and transmitted to the second UE by the AS of the second UE.

The method may also include: specifying a media stream security capability between the first UE and the second UE by the first network device or the second network device according to security capabilities provided by the first UE and the second UE.

The method may also include: transmitting the assigned end-to-end media stream security key by the first network device or the second network device to a listening device listening to the encrypted media stream by decrypting the media stream using the end-to-end media stream security key.

The media stream security key is transmitted between the first network device and the second network device, in plain text in a session message in a network domain, or through a security mechanism in the IMS network domain.

The end-to-end media stream security key may be a cipher key or an integrity key.

Another embodiment of the invention provides a system for ensuring media stream security in an IP Multimedia Subsystem network, including: a first network device of a first User Equipment, hereinafter referred to as UE, for assigning an end-to-end media stream security key for the first UE, transmitting the media stream security key to a second network device of a second UE, encrypting the end-to-end media stream security key using a first session key shared with the first UE, and transmitting the encrypted end-to-end media stream security key to the first UE via a first session message; and a second network device of the second UE, for encrypting the end-to-end media stream security key using a second session key shared with the second UE, and transmitting the encrypted end-to-end media stream security key to the second UE via a second session message.

Yet another embodiment of the invention provides a system for ensuring media stream security in an IP Multimedia Subsystem network, including: a first network device of a first User Equipment, hereinafter referred to as UE, for assigning an end-to-end media stream security key for the first UE, and transmitting the media stream security key to a second network device of a second UE; a third network device of the first UE, for encrypting the end-to-end media stream security key using a first session key shared with the first UE, and transmitting the encrypted end-to-end media stream security key to the first UE via a first session message; and a fourth network device of the second UE, for encrypting the end-to-end media stream security key using a second session key shared with the second UE, and transmitting the encrypted end-to-end media stream security key to the second UE via a second session message.

In the method according to an embodiment of the invention, the media stream security key is assigned for the calling UE and the called UE by an application server acting as a network device, or a network device such as a CSCF, etc. The media stream needs to be encrypted or decrypted only once by the calling UE or called UE during the transmission of the media stream. Therefore, there is no substantial affect on the performance of the IMS network device, and the quality of service for the media stream can be ensured easily. In terms of security, a key becomes invalid upon completion of the session because the key is assigned dynamically during each session. In this way, a very high security may be ensured.

Because the security capabilities of the calling UE and the called UE may be negotiated in an interactive way while negotiating the media stream security key, an end-to-end security association may be established dynamically between the calling UE and the called UE.

DETAILED DESCRIPTION OF THE EMBODIMENTS

Figure 1:
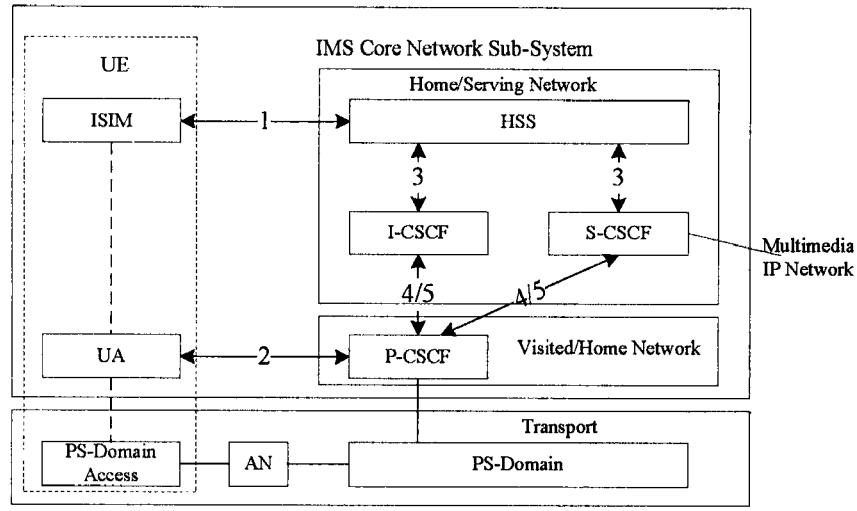
FIG. 1 is a schematic diagram illustrating an IMS network security model in the related art.
Figure 2:
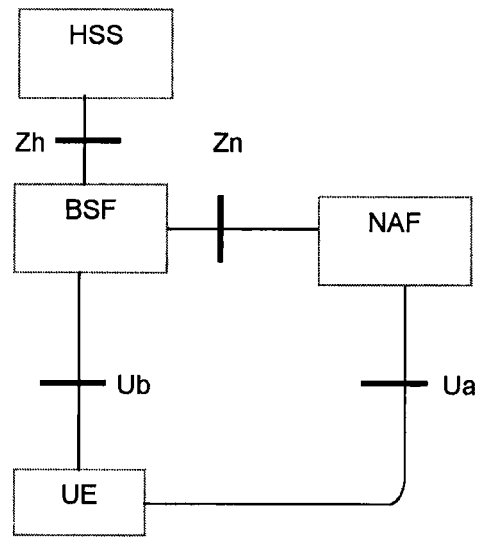
FIG. 2 is a schematic diagram illustrating a GBA model in the related art.
Figure 3:
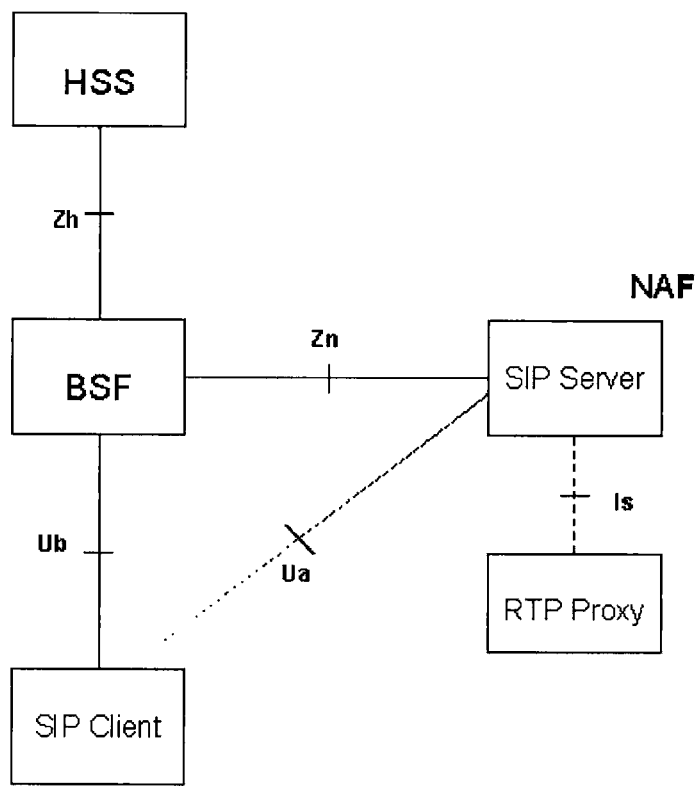
FIG. 3 illustrates an application of the GBA in media stream security.

In FIG. 1, the Call Session Control Function (CSCF) entities defined in the IMS network are operable to implement functions such as controlling, routing, etc. during call and session. Proxy-Call Session Control Function (P-CSCF), Service-Call Session Control Function (S-CSCF) and Interrogating-Call Session Control Function (I-CSCF) are distinguished from one another for the purpose of implementing different functions. Particularly, the Proxy-Call Session Control Function (P-CSCF) is used for access of a User Equipment (UE), all UEs access the network via the P-CSCF; the Service-Call Session Control Function (S-CSCF) provides the core functions, such as session controlling, routing, etc.; and the Interrogating-Call Session Control Function (I-CSCF) is used for selection of S-CSCF and intercommunications among different operators or the networks at different regions, as well as network shielding function and the like. For example, the I-CSCF may be used as the only egress for different operators. The Application Server (AS) in the IMS network provides services for users, for example, various applications such as call waiting, conference, instant message, etc. Different applications may be located in different ASs. The S-CSCF entity is responsible for forwarding a session request from a user to different ASs, depending on different services info.

In an embodiment of the invention, to reduce the times of encryption and decryption on the media stream during transmission, a security association is established directly between the Session Initiation Protocol (SIP) client, i.e. the calling UE, and the called UE, such that the media stream is protected through a direct encryption and decryption between the calling UE and the called UE, thus achieving the end-to-end media stream security.

An end-to-end media stream security key may be negotiated in two ways. The first one is that the end-to-end media stream security key is assigned by a CSCF entity. The second one is that the end-to-end media stream security key is assigned by an Application Server (AS). The end-to-end media stream security key is a Cipher Key (CK) or an Integrity Key (IK).

Figure 4:
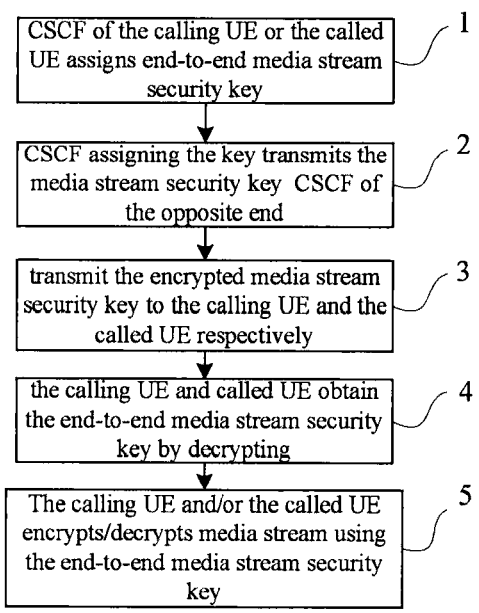
FIGS. 4 and 5 are flow charts illustrating embodiments of the invention.

Referring to FIG. 4, the end-to-end media stream security is implemented in the first way as follows.

Block 1: during the process of establishing a session, an S-CSCF among the CSCF entities with which the calling UE or the called UE is registered determines whether the media streams for this session need to be protected, according to subscription information of the UE, or an instruction from the AS regarding protection of the media stream in a session message. If protection is necessary, the S-CSCF assigns the end-to-end media security key according to the protection way specified in the subscription information. If the specified protection way is by encryption, an end-to-end Cipher Key (CK) is assigned. If the specified protection way is by integrity protection, an end-to-end Integrity Key (IK) is assigned.

Block 2: after assigning the end-to-end media stream security key, the S-CSCF of the calling UE or the called UE transmits the end-to-end media stream security key to an S-CSCF of the opposite UE in a session message of the network domain. The S-CSCF of the calling UE transmits the end-to-end media stream security key to the P-CSCF of the calling UE by using a session message, and the S-CSCF of the called UE transmits the end-to-end media stream security key to the P-CSCF of the called UE by using a session message.

If it is assumed to be trustable or secure in the network domain, the end-to-end media stream security key may be transmitted in plain text (i.e. the key is not protected by encryption at all). Practically, the end-to-end media stream security key may be transmitted through the security mechanism in the IMS network domain.

Block 3: the P-CSCF to which the calling UE or the called UE accesses encrypts the end-to-end media stream security key using a cipher key shared between the calling UE or called UE and the P-CSCF, the cipher key is obtained by the UE through negotiation during the process of registering Authentication and Key Agreement (AKA).

Block 4: the P-CSCF to which the calling UE access transmits the encrypted media stream security key to the calling UE in cipher text by using a session message, and the P-CSCF to which the called UE access transmits the encrypted media stream security key to the called UE in cipher text by using a session message, so as to ensure that the end-to-end media stream security key is transmitted securely in the insecure access-side network. Either of the calling UE or called UE obtains the end-to-end media stream security key between the calling UE and called UE by decrypting the encrypted media stream security key using the session key (i.e., the cipher key) shared with the P-CSCF.

Block 5: media stream messages are transmitted between the calling UE and the called UE after being encrypted or integrity-protected using the end-to-end media stream security key according to the Security Association (SA) negotiated during the process of establishing the session, thus achieving the end-to-end media stream security.

If only the media stream from the calling UE to the called UE needs to be protected, the calling UE encrypts or integrity-protects the media stream using the end-to-end media stream security key before sending the media stream to the called UE, while the called UE authenticates and decrypts the received media stream using the end-to-end media stream security key, and does not encrypt the media stream to be sent. If only the media stream from the called UE to the calling UE needs to be protected, the process is similar as the above. If both the media streams sent by the calling UE and the called UE need to be protected, both of the two parties encrypt or integrity-protect the media streams using the end-to-end media stream security key before sending the media streams, and decrypt the received media streams using the end-to-end media stream security key.

Figure 5:
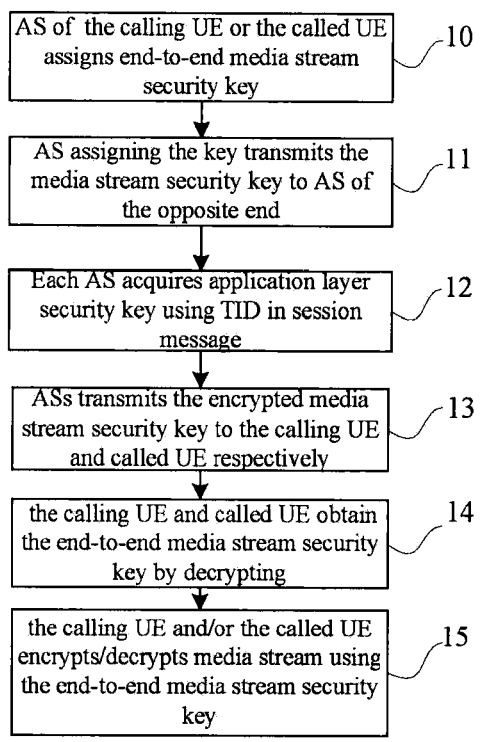

Referring to FIG. 5, the end-to-end media stream security is implemented in the second way as follows.

Before initiating a session, each of the calling UE and called UE negotiates a security key to be shared between each of the calling UE and the called UE and Network Application Function (NAF) during the process of registering and authenticating AKA, in combination with the GBA procedures. When initiating or responding to a session request subsequently, the calling UE or the called UE carries a Bootstrapping procedure Transaction identifier (B-TID) in a session message or during interaction with the NAF (alternatively, an application layer security key may be negotiated between the UE and NAF in another way, the detailed description of which is not limited to the above).

Block 10: during the process of establishing a session, an Application Server (AS) of the calling UE or the called UE determines whether the media streams for this session need to be protected, according to a requirement of the service or the subscription information of the user. If the protection is needed, the AS assigns the end-to-end media security key according to the protection way specified in the subscription information or the requirement of the service. If the specified protection way is by encryption, the end-to-end Cipher Key (CK) is assigned. If the specified protection way is by integrity protection, the end-to-end Integrity Key (IK) is assigned.

Block 11: the AS assigning the end-to-end media stream security key encrypts the end-to-end media stream security key through the security mechanism in the network domain and transmits the encrypted media stream security key by using a session message to an AS of the opposite UE.

If the network domain is assumed to be trustable, the key may be transmitted in plain text in the network domain.

Block 12: the AS of the calling UE requests an application layer security key shared between the NAF and the calling UE from the Bootstrapping Server Function (BSF) according to the Bootstrapping procedure Transaction identifier (B-TID) carried in the session message from the calling UE, the AS of the called UE requests an application layer security key shared between the NAF and the called UE from the Bootstrapping Server Function (BSF) according to the Bootstrapping procedure Transaction identifier (B-TID) carried in the session message from the called UE.

The application layer security key may also be stored in a Home Subscriber Server (HSS). In this case, the AS of either of the calling UE or the called UE acquires the key from the HSS according to the B-TID carried in the session message from the UE (practically, the application layer key may be assigned between the AS and the UE in other ways).

Block 13: the AS of the calling UE or the called UE encrypts media stream security key using the application layer security key shared with the UE, respectively, and transmits the encrypted media stream security key to the calling UE or the called UE via a session message, respectively.

Block 14: the calling UE or called UE obtains the end-to-end media stream security key between the calling UE and called UE by decrypting the encrypted media stream security key using the application layer key shared with the AS.

Block 15: media stream messages are transmitted between the calling UE and the called UE after being encrypted or integrity-protected using the end-to-end media stream security key according to the Security Association (SA) negotiated during the process of establishing the session, thus achieving the end-to-end media stream security.

If only the media stream from the calling UE to the called UE needs to be protected, the calling UE encrypts or integrity-protects the media stream using the end-to-end media stream security key before sending the media stream to the called UE, while the called UE authenticates and decrypts the received media stream using the end-to-end media stream security key and does not encrypt the media stream to be sent. If only the media stream from the called UE to the calling UE needs to be protected, the process is similar as the above. If both the media streams sent by the calling UE and the called UE need to be protected, both of the two parties encrypt or integrity-protect the media streams using the end-to-end media stream security key before sending the media streams, and decrypt the received media stream using the end-to-end media stream security key.

In block 12, the application layer security key shared between an Application Server (AS) and a User Equipment (UE) may be acquired in another way in related art.

For the format of a media stream message after being encrypted or integrity-protected, reference may be made to the definition of the format of RTP message in the Draft "Security RTP" of the IETF. Such a message format is substantially the similar as the format of RTP message, and defines information such as message to be encrypted, message to be authenticated, and locations of the encryption and authentication information in message, etc.

While negotiating the end-to-end media stream security key during the process of establishing a session, the security capabilities of the calling UE and the called UE may be negotiated in an interactive way, for example, information such as the supported algorithm for encryption or integrity protection, etc. The procedure and mechanism are similar to those described in the RFC 3329 Security Mechanism Agreement for the Session Initiation Protocol (SIP). While determining whether the media stream needs to be protected and assigning a security key, the AS or S-CSCF may specify the media stream capability between the calling UE and the called UE according to the security capabilities submitted by the calling UE and the called UE, thus establishing an end-to-end security association between the calling UE and the called UE.

The media stream is encrypted on an end-to-end basis during transmission. However, the end-to-end media stream security key is assigned by the AS or S-CSCF, thus, when the encrypted media stream transmitted needs to be listened to, the AS or S-CSCF may route the session, passing through a listening device, to the called UE while assigning the end-to-end media stream security key, so that the media stream of user is relayed to the listening device. The AS or S-CSCF send the Cipher Key (CK) to the listening device during the process of exchanging session messages with the listening device, so that the listening device may listen to the encrypted media stream by decrypting the media stream.

It is apparent to those skilled in the art that various modifications and variations may be made to the invention without departing from the spirit and scope of the invention. Therefore, such modifications and variations are intended to be encompassed in the invention provided that they fall into the scope of the invention as defined by the appended claims and their equivalents.

What is claimed is:

1. A method for ensuring media stream security in an IP Multimedia Subsystem (IMS) network, comprising:
    assigning, by a first network device serving of a first User Equipment (UE), an end-to-end media stream security key for the first UE, and transmitting the end-to-end media stream security key to a second network device serving a second UE;
    encrypting, by a third network device, the end-to-end media stream security key using a first session key shared with the first UE, and transmitting, by the third network device, the encrypted end-to-end media stream security key to the first UE via a first session message;
    encrypting, by a fourth network device, the end-to-end media stream security key using a second session key shared with the second UE, and transmitting, by the fourth network device, the encrypted end-to-end media stream security key to the second UE via a second session message; and
    encrypting or decrypting a media stream, by at least one of the first UE or the second UE, using the end-to-end media stream security key;
    wherein the end-to-end media stream security key is transmitted from the first network device to the third network device; and the end-to-end media stream security key is transmitted from the second network device to the fourth network device.

2. The method according to claim 1, wherein the first network device is a Service-Call Session Control Function (S-CSCF) entity serving the first UE; the second network device is a S-CSCF entity serving the second UE; the third network device is a Proxy-Call Session Control Function (P-CSCF) entity serving the first UE; and a fourth network device is a P-CSCF entity serving the second UE.

3. The method according to claim 1, further comprising:
    specifying a media stream security capability between the first UE and the second UE by the first network device or the second network device according to security capabilities provided by the first UE and the second UE.

4. The method according to claim 1, further comprising:
    transmitting the assigned end-to-end media stream security key by the first network device or the second network device to a listening device;
    wherein the listening device listens to the encrypted media stream by decrypting the media stream using the end-to-end media stream security key.

5. The method according to claim 1, wherein the end-to-end media stream security key is transmitted between the first network device and the second network device, in plain text in a session message of a network domain, or through a security mechanism in the IMS network domain.

6. The method according to claim 1, wherein the first network device determines whether to assign the end-to-end media stream security key, according to subscription information of the first UE, or according to an instruction from an application server regarding protection of the media stream in a session message.

7. A method for ensuring media stream security in an IP Multimedia Subsystem (IMS) network, comprising:
    assigning, by a first network device serving a first User Equipment (UE), an end-to-end media stream security key for the first UE, and transmitting the end-to-end media stream security key to a second network device serving a second UE;
    encrypting, by the first network device, the end-to-end media stream security key using a first session key shared with the first UE, and transmitting, by the first network device, the encrypted end-to-end media stream security key to the first UE via a first session message;
    encrypting, by the second network device, the end-to-end media stream security key using a second session key shared with the second UE, and transmitting, by the second network device, the encrypted end-to-end media stream security key to the second UE via a second session message; and
    encrypting or decrypting a media stream, by at least one of the first UE or the second UE, using the end-to-end media stream security key;
    wherein the first network device is an Application Server (AS) entity in the IMS network providing services for the first UE, the second network device is an AS entity in the IMS network providing services for the second UE.

8. The method according to claim 7, wherein the first network device determines whether to assign the end-to-end media stream security key according to subscription information of the first UE, or requirement of service.

9. The method according to claim 8, wherein the first network device acquires an application layer key shared with the first UE from a Bootstrapping Server Function (BSF) or a Home Subscriber Server (HSS) using a Bootstrapping procedure Transaction identifier (B-TID) carried in a session message from the first UE; and
    the second network device acquires an application layer key shared with the second UE from an BSF or a HSS using a B-TID carried in a session message from the second UE.

10. A system for ensuring media stream security in an IP Multimedia Subsystem (IMS) network, comprising:

a first network device serving a first User Equipment (UE), configured to assign an end-to-end media stream security key for the first UE, transmit the media stream security key to a second network device serving a second UE, encrypt the end-to-end media stream security key using a first session key shared with the first UE, and transmit the encrypted end-to-end media stream security key to the first UE via a first session message; and a second network device serving the second UE, configured to encrypt the end-to-end media stream security key using a second session key shared with the second UE, and transmit the encrypted end-to-end media stream security key to the second UE via a second session message;

wherein the first network device is an Application Server (AS) entity in the IMS network providing services for the first UE, the second network device is an AS entity in the IMS network providing services for the second UE.

11. The system according to claim 10, wherein
the first network device is further configured to specify a media stream security capability between the first UE and the second UE according to security capabilities provided by the first UE and the second UE.

12. The system according to claim 10, wherein:
the first network device is further configured to transmit the end-to-end media stream security key to a listening device; and
wherein the listening device listens to the encrypted media stream by decrypting the media stream using the end-to-end media stream security key.

13. The system according to claim 10, wherein the first network device is further configured to determine whether to assign the end-to-end media stream security key according to subscription information of the first UE, or requirement of service.

14. A system for ensuring media stream security in an IP Multimedia Subsystem network, comprising:
a first network device serving a first User Equipment (UE),
a second network device serving a second UE,
a third network device also serving the first UE, and
a fourth network device also serving the second UE,
wherein the first network device is configured to assign an end-to-end media stream security key for the first UE, and transmit the media stream security key to the second network device and the third network device;

the second network device is configured to transmit the end-to-end media stream security key to the fourth network device;

the third network device is configured to encrypt the end-to-end media stream security key using a first session key shared with the first UE, and transmit the encrypted end-to-end media stream security key to the first UE via a first session message; and the fourth network device is configured to encrypt the end-to-end media stream security key using a second session key shared with the second UE, and transmit the encrypted end-to-end media stream security key to the second UE via a second session message.

15. The system according to claim 14, wherein the first network device is a Service-Call Session Control Function (S-CSCF) entity serving the first UE; the second network device is a S-CSCF entity serving the second UE; the third network device is a Proxy-Call Session Control Function (P-CSCF) entity serving the first UE; and the fourth network device is a P-CSCF entity serving the second UE.

16. The system according to claim 14, wherein
the first network device is further configured to specify a media stream security capability between the first UE and the second UE according to security capabilities provided by the first UE and the second UE.

17. The system according to claim 14, wherein:
the first network device is further configured to transmit the end-to-end media stream security key to a listening device; and
wherein the listening device listens to the encrypted media stream by decrypting the media stream using the end-to-end media stream security key.

18. The system according to claim 14, wherein the first network device is further configured to determine whether to assign the end-to-end media stream security key, according to subscription information of the first UE, or according to an instruction from an application server regarding protection of the media stream in a session message.

* * * * *